United States Patent
Araki

(10) Patent No.: US 7,422,050 B2
(45) Date of Patent: Sep. 9, 2008

(54) AIR CONDITIONING APPARATUS FOR VEHICLE

(75) Inventor: Yoshinori Araki, Kariya (JP)

(73) Assignee: Denso Corporation, Kariya (JP)

( * ) Notice: Subject to any disclaimer, the term of this patent is extended or adjusted under 35 U.S.C. 154(b) by 544 days.

(21) Appl. No.: 10/895,755

(22) Filed: Jul. 21, 2004

(65) Prior Publication Data

US 2005/0016723 A1    Jan. 27, 2005

(30) Foreign Application Priority Data

Jul. 25, 2003    (JP)    ............................. 2003-280280

(51) Int. Cl.
    *B60H 1/00*    (2006.01)
(52) U.S. Cl. ........................... 165/43; 165/42; 165/202; 165/203; 165/204; 62/244; 237/12.3 A; 237/12.3 B; 454/156; 454/160; 454/161
(58) Field of Classification Search ................. 165/203, 165/202, 204, 42, 43, 205; 62/244; 237/12.3 A, 237/12.3 B; 454/156, 160, 161
See application file for complete search history.

(56) References Cited

U.S. PATENT DOCUMENTS

| | | | | |
|---|---|---|---|---|
| 3,179,338 A | * | 4/1965 | Ostrander | 236/13 |
| 4,549,601 A | * | 10/1985 | Wellman et al. | 165/205 |
| 4,706,461 A | * | 11/1987 | Pratt et al. | 165/202 |
| 5,564,975 A | * | 10/1996 | Northcutt | 454/298 |
| 5,950,711 A | | 9/1999 | Bendell | |
| 6,131,652 A | * | 10/2000 | Ito et al. | 165/204 |

| | | | |
|---|---|---|---|
| 2001/0017203 A1 | | 8/2001 | Uemura et al. |

FOREIGN PATENT DOCUMENTS

| | | | |
|---|---|---|---|
| FR | 2 531 666 | | 6/1983 |
| JP | 48-28500 | | 8/1973 |
| JP | 60-113715 | | 6/1985 |
| JP | 61188214 A | * | 8/1986 |
| JP | 6-58564 | | 3/1994 |
| JP | 8-268040 | | 10/1996 |
| JP | 10129246 A | * | 5/1998 |
| JP | 2003104033 A | * | 4/2003 |

OTHER PUBLICATIONS

Office Action mailed on Mar. 4, 2008 in the corresponding JP application No. 2003-280280.

* cited by examiner

*Primary Examiner*—John K Ford
(74) *Attorney, Agent, or Firm*—Harness, Dickey & Pierce, PLC

(57) ABSTRACT

In an air conditioning apparatus for a vehicle, a blower unit is arranged such that air is discharged in a substantially front and rear direction of the vehicle. An evaporator is opposed to an air discharge port of the blower unit and inclined at an angle equal to or greater than 45 degrees with respect to a horizontal plane. The heater core is arranged horizontally above the blower unit and an end of the heater core is adjacent to an upper end of the evaporator. Further, a slide door is provided downstream of the air discharge port to distribute the air toward the evaporator and the heater core. By this arrangement, dimensions of the air conditioning apparatus are reduced with respect to horizontal and vertical directions. Thus, this compact air conditioning apparatus can be installed in a small space such as in a center console or an interior side trim space.

12 Claims, 6 Drawing Sheets

AIR CONDITIONING APPARATUS FOR VEHICLE

CROSS REFERENCE TO RELATED APPLICATION

This application is based on Japanese Patent Application No. 2003-280280 filed on Jul. 25, 2003, the disclosure of which is incorporated herein by reference.

FIELD OF THE INVENTION

The present invention relates to an air conditioning apparatus for a vehicle.

BACKGROUND OF THE INVENTION

In a vehicle air conditioning apparatus, two heat exchangers such as an evaporator and a heater core are generally arranged in a substantially V-shape downstream of a blower unit. The air conditioning apparatus having this arrangement is for example disclosed in Unexamined Japanese Patent Publication No. JP-A-8-268040.

In a case that this kind of air conditioning apparatus is installed in a center console between front seats or an interior side trim space of a vehicle, it will be arranged such that an axis of a blower fan extends in a left and right direction of a vehicle and air is discharged from the blower unit in a substantially front and rear direction of the vehicle. Also, the evaporator and the heater core will be arranged to form the V-shape between them when viewed from the top.

In general, it is preferable to arrange the evaporator and the heater core such that the air is substantially perpendicularly introduced in the evaporator and the heater core. In the console or the side trim, however, a space for installing the air conditioning apparatus is limited, especially, in the left and right direction. Therefore, it is difficult to maintain an inside angle of the V-shape between the heater core and the evaporator.

If the inside angle is reduced, it is required to increase air passage spaces downstream of the heater core and the evaporator to reduce air flow resistance downstream of the heater core and the evaporator. However, this causes an increase in size of the air conditioning apparatus.

SUMMARY OF THE INVENTION

The present invention is made in view of the foregoing matters, and it is an object of the present invention to provide a compact air conditioning apparatus suitable for installing in a small space such as a console or an interior side trim space in a vehicle.

According to the present invention, an air conditioning apparatus for a vehicle includes a blower unit, a first heat exchanger, a second heat exchanger, an air distributing means and a case. The blower unit is arranged in the case. The blower unit forms an air discharge port through which air is discharged into the case. The first heat exchanger is arranged to oppose the air discharge port and inclined at an angle equal to or greater than 45 degrees with respect to a horizontal plane. The second heat exchanger is arranged substantially parallel to the horizontal plane. Also, an end of the second heat exchanger is located adjacent to an upper end of the first heat exchanger. The air distributing means is arranged downstream of the air discharge port of the blower unit to distribute the air toward the first heat exchanger and the second heat exchanger. One of the first and second heat exchangers is a heat exchanger for cooling air and the other is a heat exchanger for heating the air.

Accordingly, since only the first heat exchanger is opposed to the air discharge port, a dimension of the. case in a left and right direction of the vehicle is smaller than a case in which two heat exchangers are arranged to oppose the air discharge port of the blower unit. Further, since the first heat exchanger is inclined at an angle equal to or greater than 45 degrees with respect to the horizontal plane, a dimension of the case with respect to the front and rear direction is reduced. In addition, since the second heat exchanger is arranged substantially parallel to the horizontal plane, a dimension of the case with respect to a vertical direction is reduced. Accordingly, the size of the air conditioning apparatus is reduced. Therefore, the air conditioning apparatus can be installed in a small space such as in the center console or the interior side trim space of the vehicle.

BRIEF DESCRIPTION OF THE DRAWINGS

Other objects, features and advantages of the present invention will become more apparent from the following detailed description made with reference to the accompanying drawings in which like parts are designated by like reference numbers and in which.

DETAILED DESCRIPTION OF EMBODIMENTS

Figure 1:
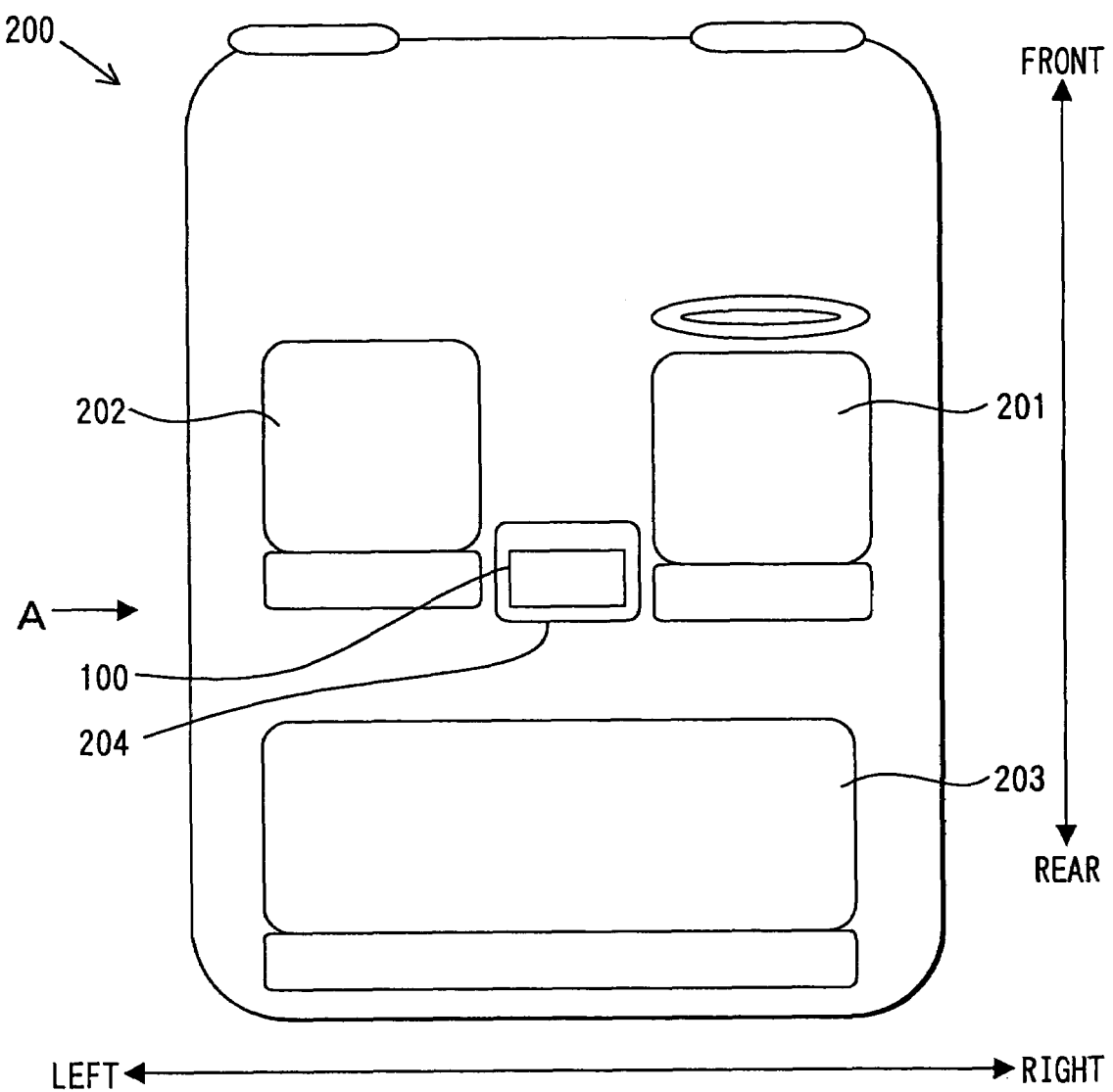
FIG. 1 is a schematic plan view of a vehicle, when viewed from a top, in which an air conditioning apparatus is arranged in a center console according to a first embodiment of the present invention.

Embodiments of the present invention will be described hereinafter with reference to the drawing.

First Embodiment

Figure 2:
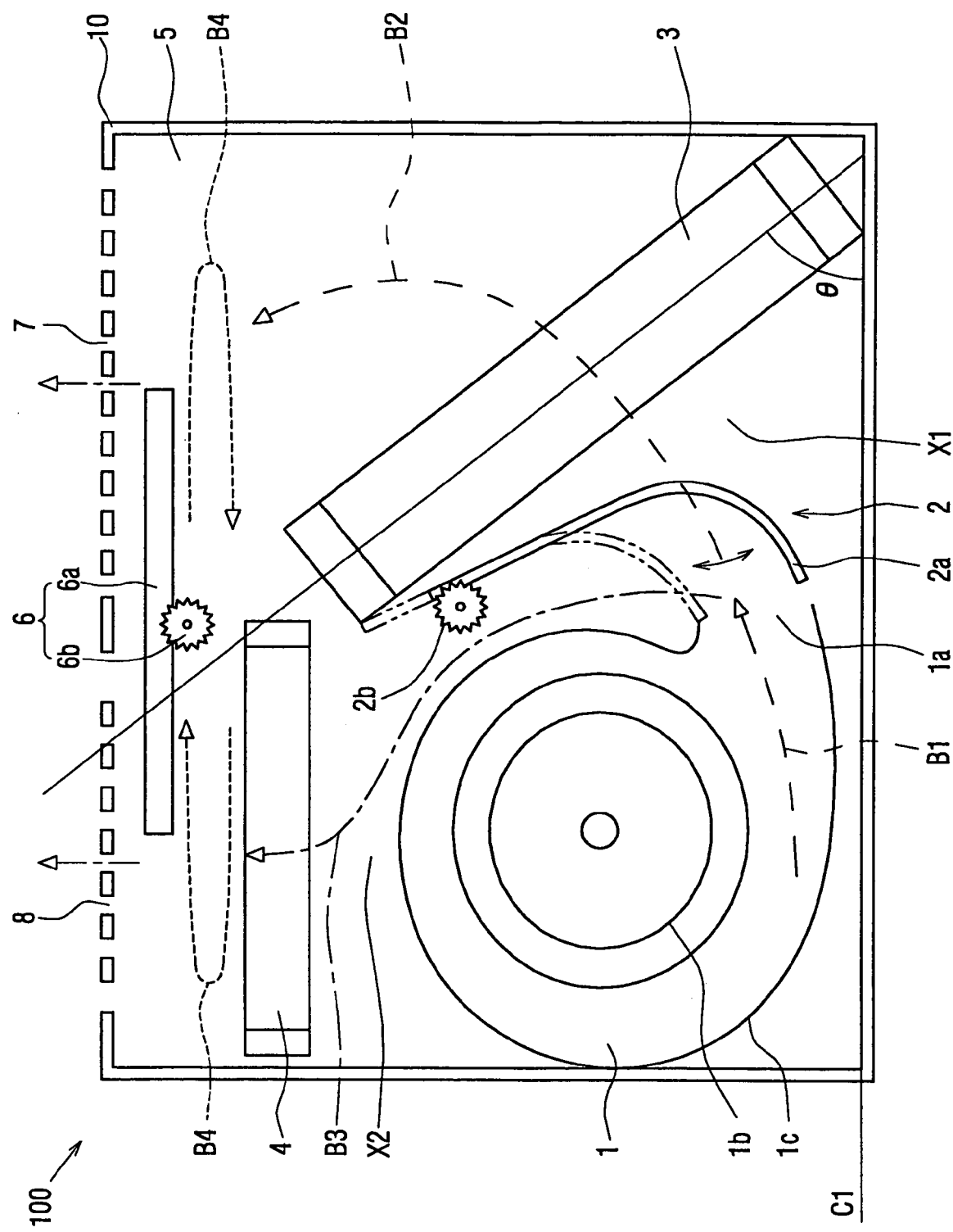
FIG. 2 is a side view of the air conditioning apparatus, when viewed along an arrow A in FIG. 1.

Referring to FIG. 1, a vehicle air conditioning apparatus 100 of the embodiment is housed in a center console 204, which is provided between a driver seat 201 and a front passenger seat 202 and in front of rear passenger seats 203. As shown in FIG. 2, the air conditioning apparatus 100 has a case 10 made of a resin material. The case 10 has a substantially rectangular parallelepiped shape. The case 10 encases a blower unit 1, a first slide door 2, an evaporator (first heat exchanger) 3, a heater core (second heat exchanger) 4, a second slide door 6, and the like therein.

The blower unit 1 has a centrifugal fan 1b, which is driven by a motor (not shown), and a scroll casing 1c encasing the centrifugal fan 1b. The scroll casing 1c forms an air discharge port 1a through which air B1 blown by the centrifugal fan 1b is blown toward the first slide door 2.

The first slide door 2 is arranged to oppose the air discharge port 1a. The first slide door (air distributing means) 2 is provided to distribute the air B1 toward the evaporator 3 and the heater core 4, which are arranged downstream of the blower unit 2 with respect to the flow of air. The first slide door 2 is constructed of a slide plate 2a on which teeth or cog (not shown) is formed and a gear 2b, which meshes the teeth of the slide plate 2a. The gear 2b is connected to a temperature setting lever (not shown) through a linking mechanism (not shown). The temperature setting lever is provided in the air conditioning apparatus 100 and operated by a user. The gear 2b is rotated by the operation of the temperature setting lever. With the rotation of the gear 2a, the slide plate 2a is moved in a substantially up and down direction of the vehicle. In the embodiment, a lower end of the slide plate 2a is for example curved to facilitate the air flow.

By the movement of the first slide door 2, the air B1 discharged from the blower unit 1 is distributed toward the evaporator 3 and/or the heater core 4. Furthermore, the amount of air B2 introduced to the evaporator 3 and the amount of air B3 introduced to the heater core 4 are determined in accordance with the position of the first slide door 2.

The evaporator 3 is a heat exchanger for cooling the air B2 by performing heat exchange between the air B2 and a refrigerant flowing therein. The heater core 4 is a heat exchanger for heating the air B3 by performing heat exchange between the air B3 and a warm water flowing from an engine (not shown) of the vehicle. Namely, the air B2 is cooled by the evaporator 3 and the air B3 is heated by the heater core 4.

Inside the case 10, a first gap X1 is defined between the first slide door 2 and the evaporator 3. Also, a second gap X2 is defined between the first slide door 2 and the heater core 4. The first gap X1 and the second gap X2 are provided to facilitate the air B2 and the air B3 to flow toward and pass through the evaporator 3 and the heater core 4, respectively.

The evaporator 3 is arranged in an inclined position with respect to a horizontal plane C1. An angle θ of inclination with respect to the horizontal plane C1 is equal to or greater than 45 degrees. Also, the evaporator 3 is opposed to the air discharge port 1a.

The case 10 forms an air mix chamber 5 at a position downstream of the evaporator 3 and the heater core 4. The cooled air B2 passed through the evaporator 3 and the heated air B3 passed through the heater core 4 are mixed in the air mix chamber 5. An air mix ratio of the cooled air B2 to the heated air B3 is determined in accordance with the position of the first slide door 2, which is operated through the temperature setting lever. Therefore, conditioned air B4, having a desired temperature, is produced.

The case 10 further forms a face air-blowing opening (first opening) 7 and a foot air-blowing opening (second opening) 8, at positions downstream of the air mix chamber 5. The second slide door 6 is arranged between the air mix chamber 5 and the face and foot air-blowing openings 7, 8 to open and close the face and foot air-blowing openings 7, 8. The second slide door 6 is constructed of a slide plate 6a and a pinion gear 6b. The second slide door 6 has a structure similar to that of the first slide door 2. The slide plate 6a is moved in the vehicle front and rear direction by rotation of the gear 6b.

The gear 6b is connected to a face/foot switching lever (not shown) of the air conditioning apparatus through a linking mechanism (not shown). The face-foot switching lever is operated by the user to switch the face mode and the foot mode. By operation of the face/foot switching lever, the pinion 6b is rotated to move the slide plate 6a in the substantially vehicle front and rear direction. The face air-blowing opening 7 and the foot air-blowing opening 8 are open in accordance with the position of the second slide door 6.

The air-conditioned air B4, mixed in the air mix chamber 5 at the desired temperature, passes through either the face air-blowing opening 7 or the foot air-blowing opening 8, or both the face air-blowing opening 7 and the foot air-blowing opening 8. Thereafter, the air is introduced into a passenger compartment of the vehicle 200.

Next, advantageous effects of the embodiment will be described with reference to FIGS. 3 and 4.

Figure 3:
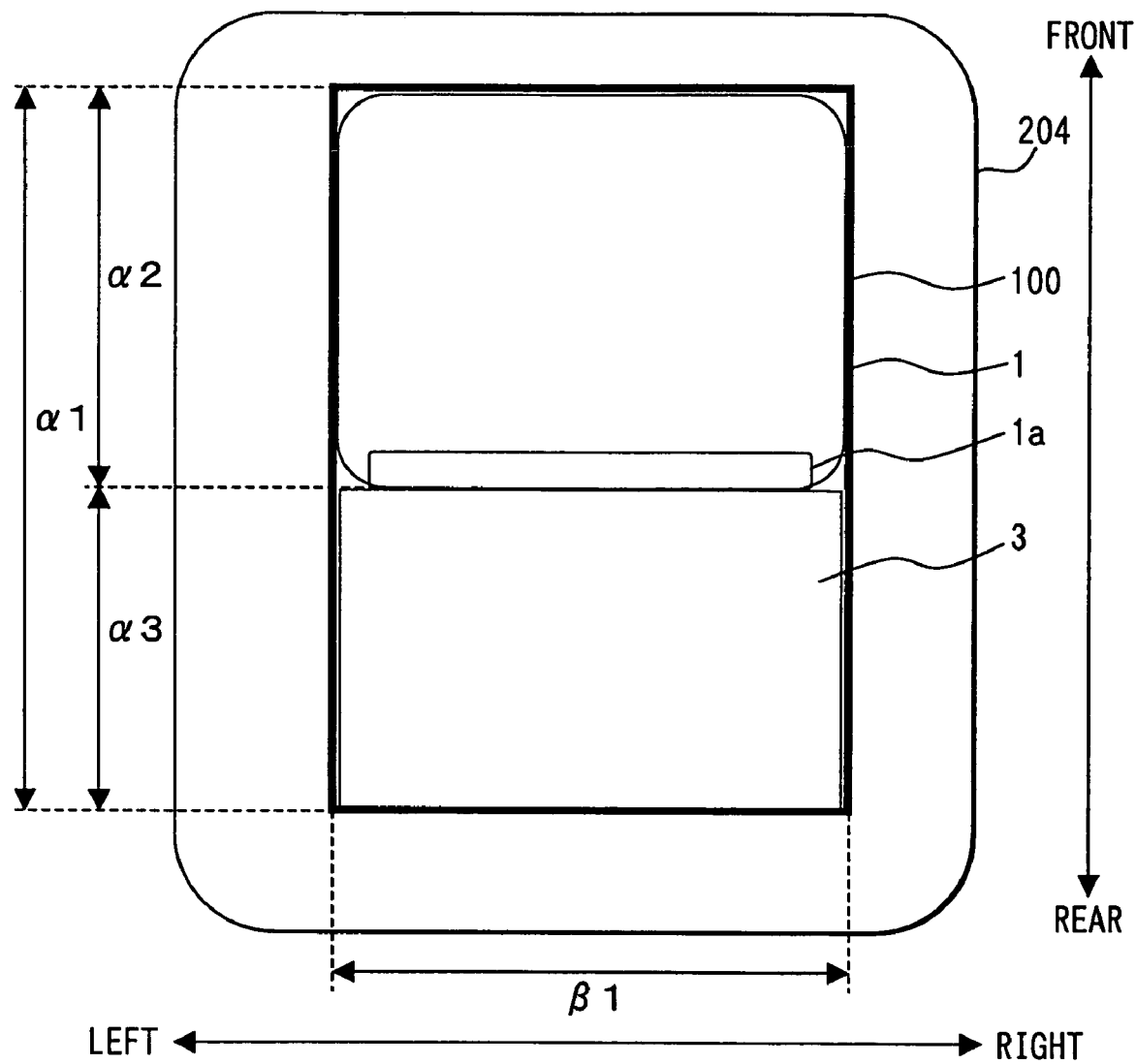
FIG. 3 is a schematic plan view of the air conditioning apparatus for showing dimensions according to the first embodiment of the present invention.

First, in FIG. 3, α1 represents a dimension of the air conditioning apparatus 100 in the vehicle front and rear direction. α2 represents a dimension of the blower fan 1 and α3 represents a dimension of the evaporator 3 in the vehicle front and rear direction. The dimension α1 of the vehicle air conditioning apparatus 100 is provided by the dimension α2 of the blower unit 1 and the third dimension α3 of the evaporator 3. Further, the evaporator 3 is inclined is inclined at least 45 degrees with respect to the horizontal plane C1. Therefore, the dimension α1 of the air conditioning apparatus 100 is reduced, as compared with that of an air conditioning apparatus in which the evaporator and the heater core are arranged to have the V-shape between them when viewed from the top.

Regarding dimensions in the vehicle left and right direction, the vehicle air conditioning apparatus 100 requires a dimension β1 that is substantially equal to a left and right dimension of the evaporator 3, which is a dimension transverse to the longitudinal direction of the evaporator 3. Therefore, the left and right dimension β1 of the air conditioning apparatus 100 of the embodiment is smaller than that of a conventional air conditioning apparatus in which two heat exchangers are arranged to oppose the air discharge port of the blower unit in the air flow direction.

Figure 4:
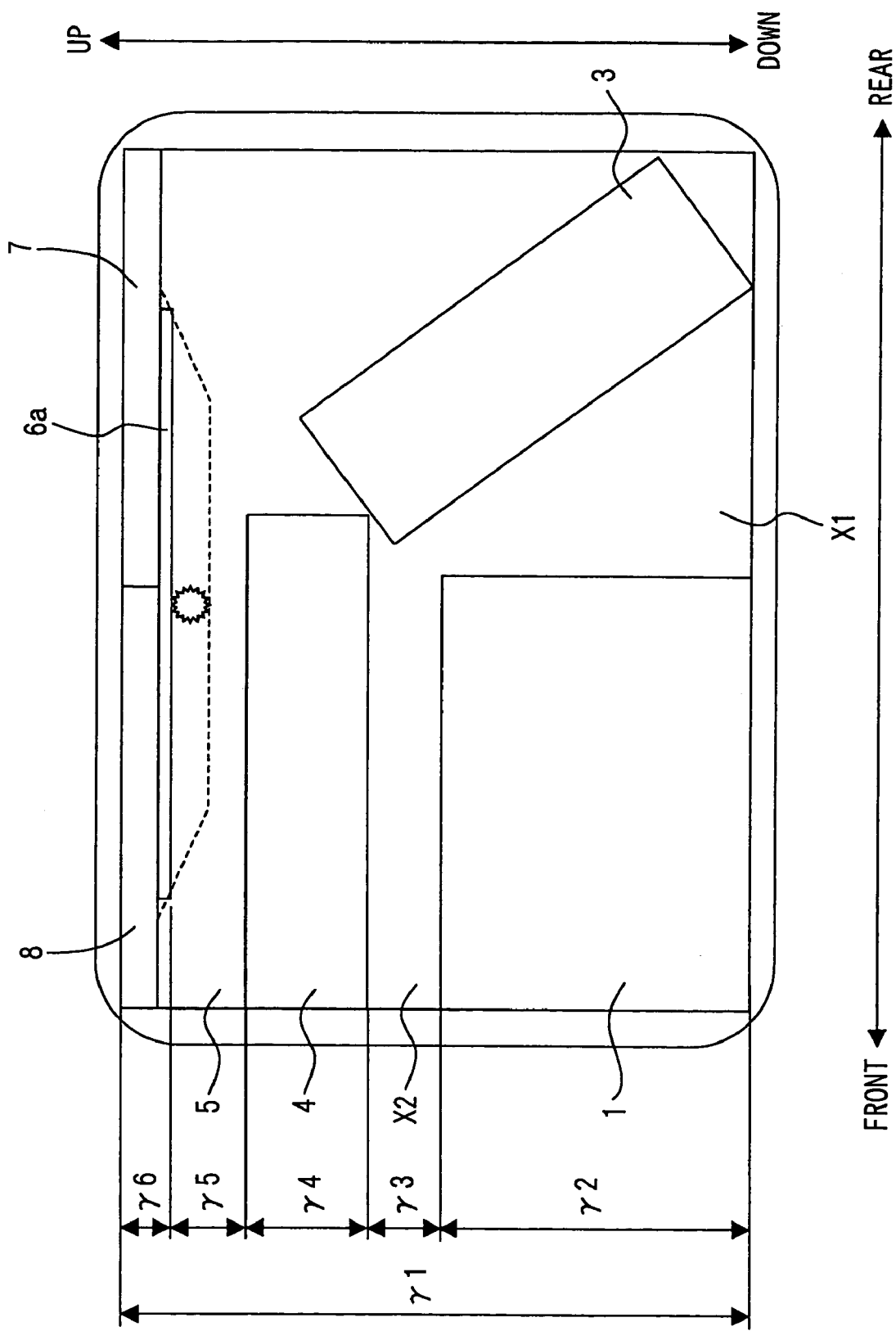
FIG. 4 is a schematic side view of the air conditioning apparatus for showing dimensions according to the first embodiment of the present invention.

Regarding dimensions in the vertical direction, in FIG. 4, γ2 represents a vertical dimension of the blower unit 1, γ3 represents a vertical dimension of the second gap X2, γ4 represents a vertical dimension of the heater core 4, γ5 represents a vertical dimension of the air mix chamber 5, γ6 represents a vertical dimension of the second slide plate 6a and the face and foot air-blowing openings 7, 8. The vertical dimension γ1 of the air conditioning apparatus 100 requires the total of the above dimensions γ2 to γ6.

The vertical dimension γ2 of the blower unit 1 is the largest and the vertical dimension γ4 of the heater core 4 is the second largest in the vertical dimensions γ2 to γ6. The dimension γ3 of the second gap X2 and the dimension γ5 of the air mix chamber 5 can be fine adjusted while assembling the air conditioning apparatus 100. The dimension γ6 of the second slide door 6 and the openings 7, 8 are adjusted in accordance with the shape.

The vertical dimension γ1 of the air conditioning apparatus 100 is mainly determined in accordance with the dimension γ2 of the blower unit 1 and the dimension γ4 of the heater core 4. Therefore, the vertical dimension γ1 is reduced, as compared with the conventional air conditioning apparatus.

Accordingly, the dimensions α1, β1, γ1 of the air conditioning apparatus 1.00 are reduced smaller than those of the conventional air conditioning apparatus. Furthermore, both of the evaporator 3 and the heater core 4 are arranged in the air conditioning apparatus 100. Therefore, a compact air conditioning apparatus 100, which is capable of being installed in the center console 204, is provided without decreasing the performance.

Second Embodiment

Figure 5:
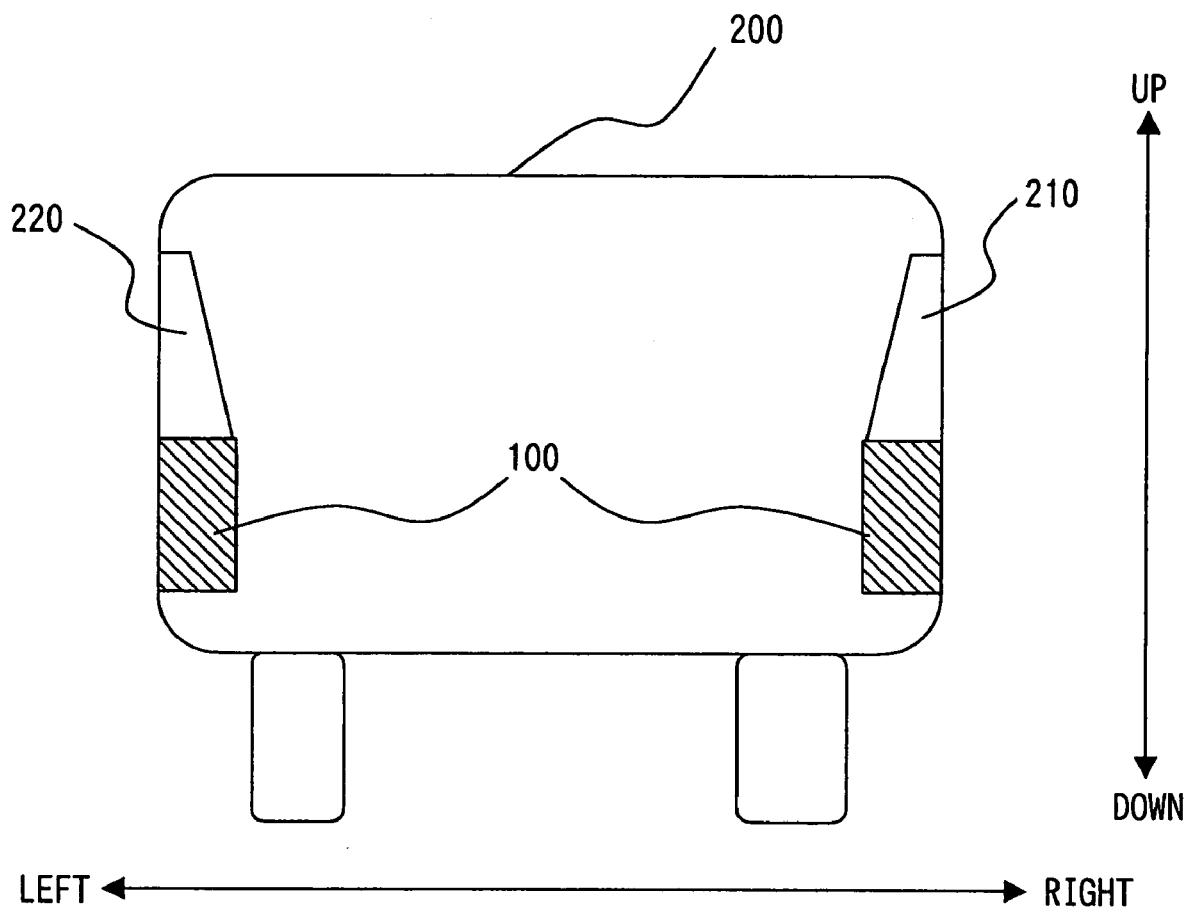
FIG. 5 is a schematic view of a vehicle in which the air conditioning apparatuses are arranged in interior side trim spaces according to a second embodiment of the present invention.

The compact air conditioning apparatus 100 can be installed in another portion in the vehicle. For example, the air conditioning apparatus 100 is installed in interior side trim spaces 210, 220 of the vehicle 200, as shown in FIG. 5. In the interior side trim spaces 210, 220, for example, speakers and goods such as drinks or maps are stored. The air conditioning apparatus 100 described in the first embodiment is compact. Therefore, it can be installed in such a small space.

Figure 6:
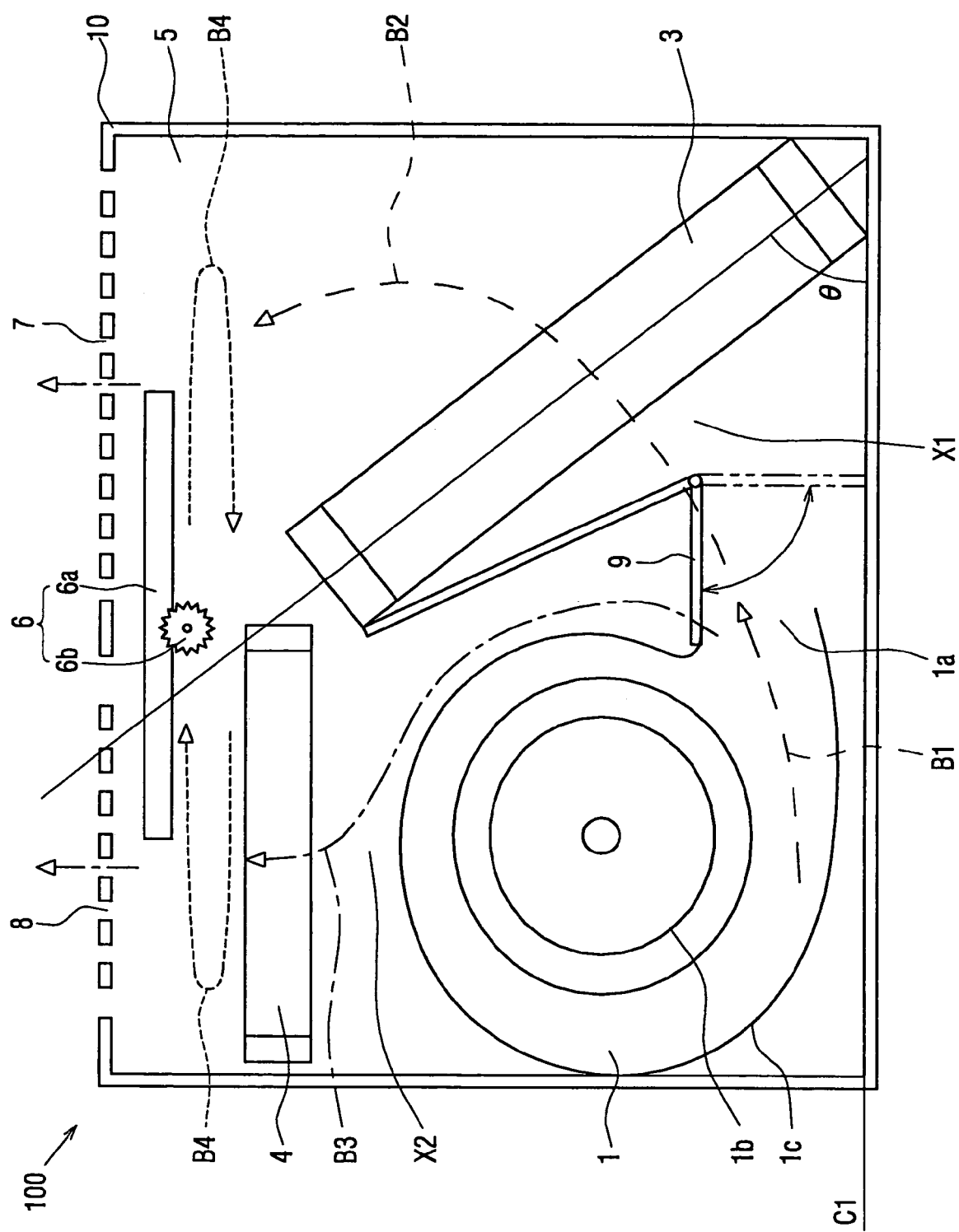
FIG. 6 is a side view of the air conditioning unit having a plate door as an air distributing means according to another embodiment of the present invention.

In the first and second embodiments, the first slide door 2 is provided as the air distributing means. Alternatively, another door member can be used as the air distributing means. For example, a plate door 9 without having the teeth can be used as shown in FIG. 6. The plate door 9 has a simple structure. The plate door 9 is rotatably supported about an axis.

In the drawings, a front and rear arrow, an up and down arrow, a left and right arrow denote arrangement directions of the air conditioning apparatus 100 with respect to the directions of the vehicle 200 when mounted to the vehicle, as an example.

Further, the positions of the evaporator 3 and the heater core 4 can be replaced with each other. For example, the heater core 4 can be arranged to oppose the air discharge port 1a of the blower unit 1, and the evaporator 3 can be arranged horizontally above the blower unit 1. Furthermore, the use of this compact air conditioning apparatus is not limited the vehicle.

The present invention is not limited to the above embodiments, but may be implemented in other ways without departing from the spirit of the invention.

What is claimed is:

1. An air conditioning apparatus for a vehicle, comprising:
   a case;
   a blower unit disposed in the case and having an air discharge port through which air is discharged;
   a first heat exchanger disposed in the case;
   a second heat exchanger disposed in the case; and
   air distributing means disposed immediately downstream of the air discharge port to separate the air discharged from the air discharge port into a first air flow directed toward the first heat exchanger and a second flow directed toward the second heat exchanger prior to the air discharged from the air discharge port flowing through the first and second heat exchangers, wherein
   the air distributing means includes a slide door;
   the first heat exchanger is arranged to oppose the air discharge port of the blower unit and is inclined at an angle equal to or greater than 45 degrees with respect to a horizontal plane,
   the second heat exchanger is arranged substantially parallel to the horizontal plane, an end of the second heat exchanger is located adjacent to an upper end of the first heat exchanger,
   one of the first and second heat exchangers is a heat exchanger for cooling the air and the other is a heat exchanger for heating the air; and
   the slide door is curved toward an end that projects in front of the air discharge port such that the air discharged from the air discharge port is smoothly directed toward at least one of the first heat exchanger and the second heat exchanger.

2. The air conditioning apparatus according to claim 1, wherein,
   the first heat exchanger is a heat exchanger for cooling the air and the second heat exchanger is a heat exchanger for heating the air.

3. The air conditioning apparatus according to claim 1, wherein
   the case forms a first opening and a second opening downstream of the first heat exchanger and the second heat exchanger with respect to an air flow direction.

4. The air conditioning apparatus according to claim 3, further comprising:
   a door disposed in the case to open and close the first opening and the second opening.

5. The air conditioning apparatus according to claim 4, wherein
   the door is constructed of a slidable plate.

6. The air conditioning apparatus according to claim 1, wherein the case is adapted to be arranged in an interior side trim space of the vehicle.

7. The air conditioning apparatus according to claim 1, wherein the case is adapted to be arranged in a console of the vehicle.

8. The air conditioning apparatus according to claim 1, wherein
   the blower unit is adapted to be arranged such that the air discharge port faces a substantially front and rear direction of the vehicle.

9. The air conditioning apparatus according to claim 1, wherein
   the second heat exchanger is located across the top of the blower unit across a clearance through which the air separated by the slide door flows toward the second heat exchanger.

10. An air conditioning apparatus, comprising:
    a case;
    a blower unit arranged in the case, the blower unit having a fan rotatable about an axis and forming an air discharge port through which air is discharged in a direction substantially perpendicular to the axis;
    a first heat exchanger arranged to oppose the air discharge port;
    a second heat exchanger arranged substantially parallel to the axis of the fan, wherein an end of the second heat exchanger is located adjacent to an end of the first heat exchanger such that the first heat exchanger and the second heat exchanger define an obtuse angle therebetween and interpose the blower unit therebetween; and
    air distributing means arranged between the first heat exchanger and the second heat exchanger, the air distributing means being disposed immediately downstream from the air discharge port to separate the air discharged from the air discharge port into a first air flow directed toward the first heat exchanger and a second air flow directed toward the second heat exchanger prior to the air discharged from the air discharge port flowing through the first and second heat exchangers; wherein
    the air distributing means includes a slide door; and
    the second heat exchanger is located across the top of the blower unit across a clearance through which the air separated by the slide door flows toward the second heat exchanger.

11. The air conditioning apparatus according to claim 10, wherein
    the first heat exchanger is inclined such that the first heat exchanger defines an angle equal to or greater than 45 degrees between itself and a direction perpendicular to the axis of the fan.

12. The air conditioning apparatus according to claim 10, wherein
    the blower unit is arranged such that the axis of the fan is substantially perpendicular to a longitudinal direction of the case.

* * * * *